UNITED STATES PATENT OFFICE.

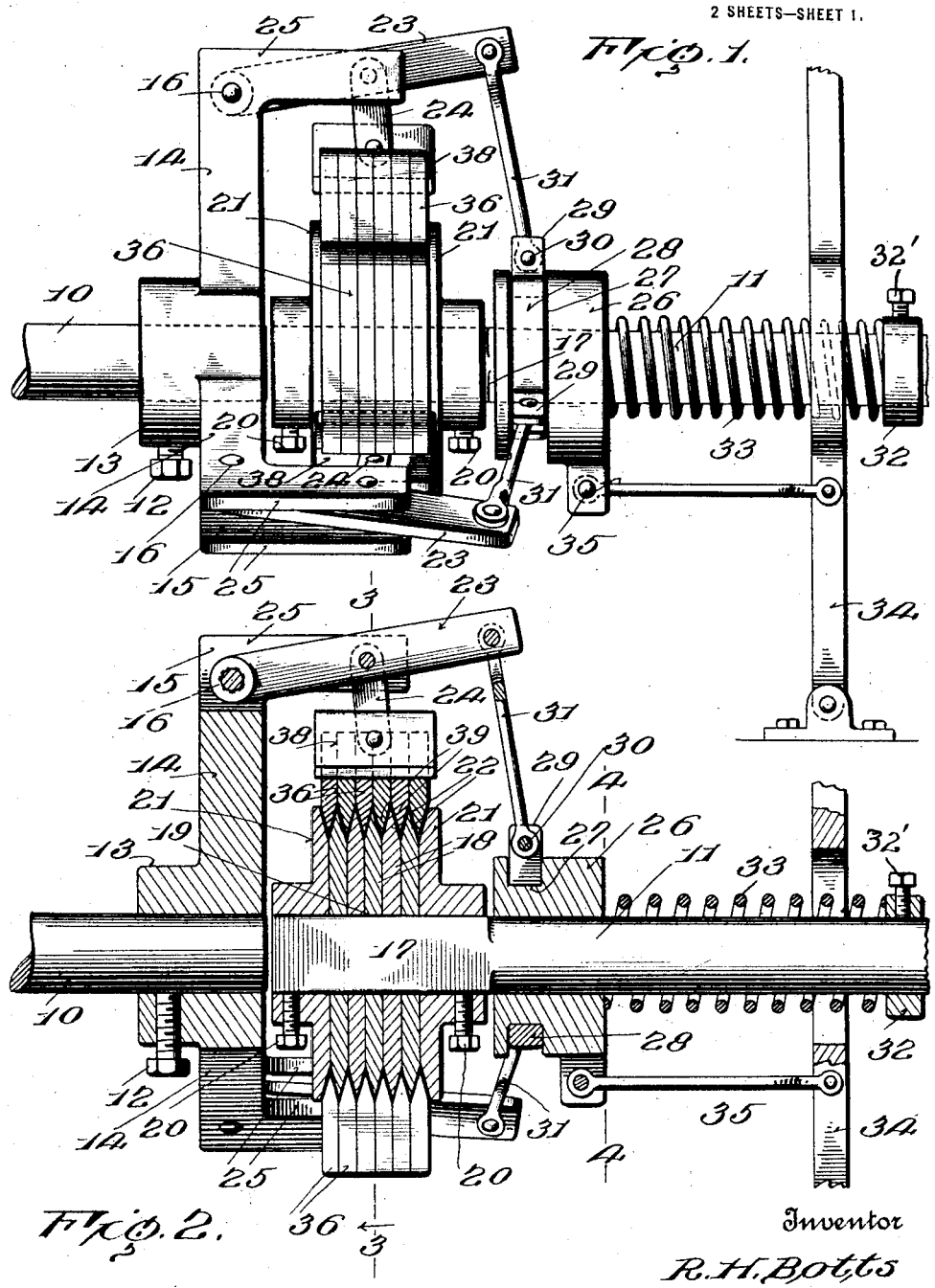

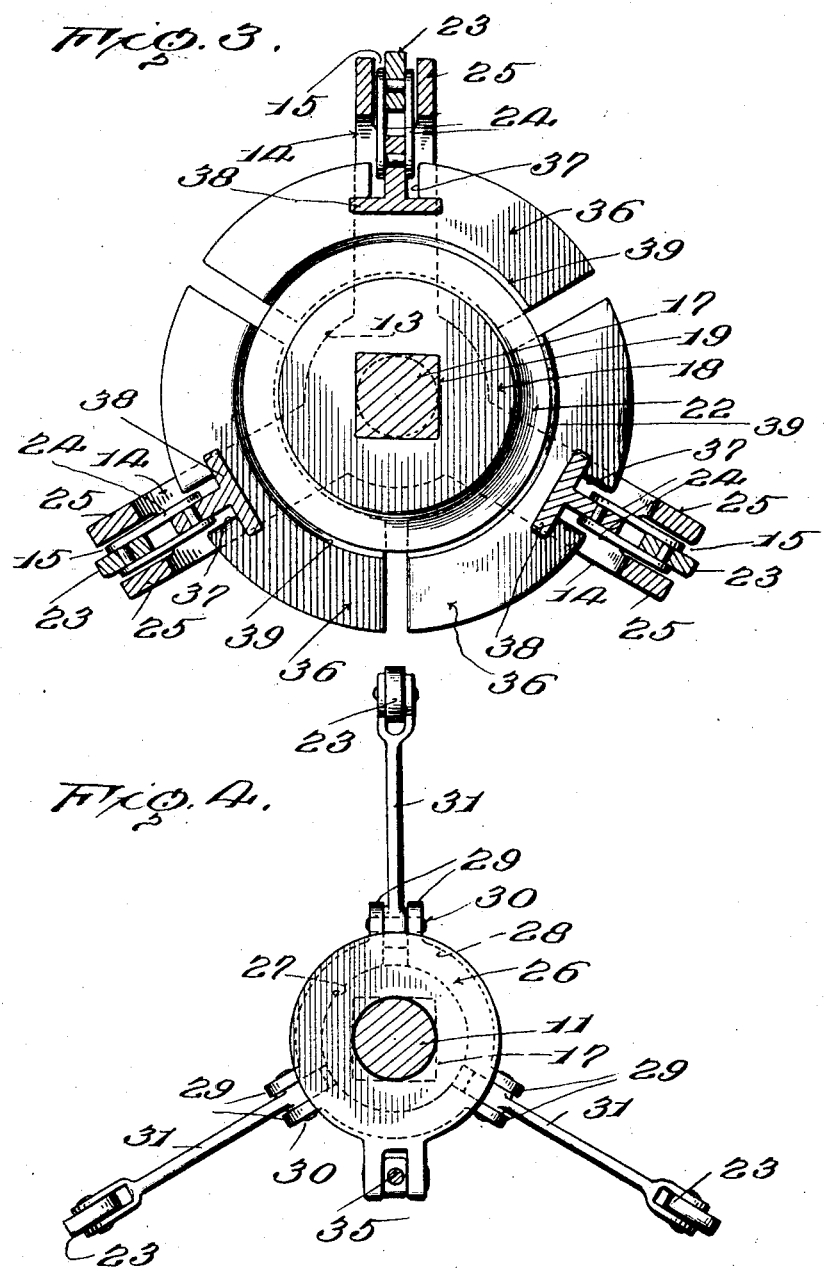

ROBERT HENRY BOTTS, OF PARKER, ARIZONA.

CLUTCH.

1,412,606.　　　Specification of Letters Patent.　　Patented Apr. 11, 1922.

Application filed April 4, 1919. Serial No. 287,574.

*To all whom it may concern:*

Be it known that I, ROBERT H. BOTTS, a citizen of the United States, residing at Parker, in the county of Yuma, State of Arizona, have invented certain new and useful Improvements in Clutches; and I do hereby declare the following to be a full, clear, and exact description of the invention, such as will enable others skilled in the art to which it appertains to make and use the same.

This invention relates to new and useful improvements in clutches.

One object of the present invention is to provide a novel and improved clutch wherein the greatest amount of surface is exposed to frictional contact, thereby increasing the efficiency of the clutch.

Another object is to provide a novel and improved clutch wherein the frictionally contacting portions are capable of adjustment to compensate for the wear thereof.

A further object is to provide a novel and improved device of this character which is simple in construction, durable in operation, and easy and effective in its application and use.

Other objects and advantages will be apparent from the following description when taken in connection with the accompanying drawing.

In the drawing:

Figure 1 is a side elevation of the clutch, the outer ends of the shafts being broken off Figure 2 is a vertical central longitudinal sectional view through the device, the shafts remaining in elevation.

Figure 3 is a vertical transverse sectional view taken on the line 3—3 of Figure 2.

Figure 4 is a vertical transverse sectional view taken on the line 4—4 of Figure 2.

Referring particularly to the accompanying drawing, 10 and 11 represent the two shafts which have their inner ends disposed in close relation, as clearly seen in Figure 2 of the drawing. Secured on the shaft 10 by means of the screw 12, is a hub 13, said hub being formed with the radiating arms 14, the outer end of each of which is bifurcated, as at 15, the furcations being transversely perforated, as at 16. This hub is secured on the shaft 10 close to the inner end thereof, as seen in Figure 2. The adjacent end of the shaft 11 is square in cross section, as shown at 17, and engaged on this portion of the shaft are the disks 18, each having a square central opening 19 for receiving the shaft. At each end of the series of disks, and secured on the shaft by means of a screw 20, is a retaining disk 21. Each of the disks 18 has a double-beveled peripheral edge, as shown at 22, for a purpose which will presently appear. Pivotally supported in each of the bifurcations 15 is one end of an arm 23, and pivotally connected to the intermediate portion of each of the arms is a link 24. The bifurcated portion of each of the arms 14 has the angularly extending parallel members 25 between which the arms 23 are guided in their pivotal movements. On the shaft 11, inwardly of the inner disk 21, is a collar 26, this portion of the shaft being circular in cross section, whereby the same will rotate within the collar. The peripheral face of the collar is formed with a groove 27 in which is removably disposed the ring 28. This ring is preferably made up of a series of segments the abutting ends of which are turned outwardly at 29 and perforated to support the pivot pins 30. Pivotally engaged with each of the pins 30 is one end of a link 31, the other end of each link being pivotally connected to the outer end of one of the arms 23. On the shaft 11, adjacent the collar 26, is a stop collar 32, and encircling the shaft with its opposite ends bearing against the collar 26 and the collar 32, is a coil spring 33. This spring normally urges the collar 26 in a direction toward the retaining collar with the result that the links 31 spread the arms 23 outwardly and hold the parts in normal inoperative position. A pivotally mounted operating lever 34 is mounted adjacent the collar 26, and is pivotally connected therewith by means of the link 35.

Disposed in concentric relation outwardly of the disks 18 are rings 36 each made up of the same number of sections or segments as there are arms 23, and in the outer peripheral face of each of said segments there is formed a transverse T-shaped opening 37 which receives therein a T-shaped block 38. Pivotally connected to each of these blocks 38 is one of the before-mentioned links 24. The inner edge of each of the sections of each of the rings 36 is double-beveled, as at 39, and is arranged to enter between two of the adjacent disks 18, the opposite beveled faces of the disks or rings 36 frictionally contacting with the beveled faces of the two adjacent disks 18, whereby large surfaces are acted upon to clutch the parts together and cause the unitary rotation of the shafts 10 and 11.

The coil spring normally holds the outer disks out of frictional contact with the inner disks, but when the operating lever is moved in a direction away from the collar 26, the outer disks will be moved inwardly and enter between the inner disks with the result that the parts will be effectively clutched together.

The collar 32 is provided with a screw 32' whereby said collar is capable of being held at different points along the shaft 11 thus enabling the operator to regulate the tension of the spring 33. Thus the clutching parts can be held in operative relation, or held in inoperative relation, as desired.

What is claimed is:

A clutch including the combination with a pair of longitudinally aligned and independently rotatable shafts, of a pair of flanged collars secured on one of the shafts, a plurality of disks secured on the shaft between the flanges of the collars and having their peripheries double-beveled, the inner edge portions of the said flanges being beveled, a member mounted on the other shaft, rock arms on the said member, pivoted arms carried by the rock arms, T-shaped blocks pivotally carried by the outer free ends of the last-named arms, and segmental disks having T-shaped slots in their outer edge portions receiving the T-shaped blocks and having their inner edge portions double-beveled for engagement between the corresponding portions of the disks.

In testimony whereof, I affix my signature, in the presence of two witnesses.

ROBERT HENRY BOTTS.

Witnesses:
B. B. BROWN,
D. F. BRIDWELL.